(12) United States Patent
Bougelet et al.

(10) Patent No.: US 11,440,245 B2
(45) Date of Patent: Sep. 13, 2022

(54) ADDITIVE MANUFACTURING METHOD FOR A TURBOFAN ENGINE OIL TANK

(71) Applicant: Safran Aero Boosters SA, Herstel (BE)

(72) Inventors: Stephane Bougelet, Profondeville (BE); Florian Cleyet, Liege (BE); Tom Henkes, Eupen (BE); Bruno Servais, Braives (BE)

(73) Assignee: SAFRAN AERO BOOSTERS SA

( * ) Notice: Subject to any disclaimer, the term of this patent is extended or adjusted under 35 U.S.C. 154(b) by 637 days.

(21) Appl. No.: 15/727,708

(22) Filed: Oct. 9, 2017

(65) Prior Publication Data

US 2018/0104893 A1    Apr. 19, 2018

(51) Int. Cl.
| | |
|---|---|
| *B29C 64/153* | (2017.01) |
| *B22F 7/06* | (2006.01) |
| *B33Y 10/00* | (2015.01) |
| *B22F 5/10* | (2006.01) |
| *B22F 10/20* | (2021.01) |
| *B33Y 80/00* | (2015.01) |
| *B29C 64/147* | (2017.01) |
| *B22F 7/04* | (2006.01) |
| *F16N 19/00* | (2006.01) |

(Continued)

(52) U.S. Cl.
CPC ............. *B29C 64/153* (2017.08); *B22F 5/10* (2013.01); *B22F 7/04* (2013.01); *B22F 7/06* (2013.01); *B22F 7/062* (2013.01); *B22F 10/20* (2021.01); *B29C 64/147* (2017.08); *B33Y 10/00* (2014.12); *B33Y 80/00* (2014.12); *F16N 19/00* (2013.01); *B22F 5/009* (2013.01); *B22F 2007/042* (2013.01); *B29L 2031/7172* (2013.01); *C22C 1/0458* (2013.01); *Y02P 10/25* (2015.11)

(58) Field of Classification Search
CPC ... B29C 64/153; B29C 64/171; B29C 64/182; B22F 3/1055; B22F 7/04
See application file for complete search history.

(56) References Cited

U.S. PATENT DOCUMENTS

| | | | | |
|---|---|---|---|---|
| 5,732,323 | A * | 3/1998 | Nyrhila | B22F 10/20 419/2 |
| 2002/0023306 | A1* | 2/2002 | Sajedi | A43D 3/04 12/133 R |

(Continued)

FOREIGN PATENT DOCUMENTS

DE    102009034566 A1 *   2/2011   ....... B60K 15/03006

OTHER PUBLICATIONS

Machine Translation DE102009034588 (Year: 2011).*
Machine translation DE102009034566A1 (Year: 2011).*

*Primary Examiner* — Matthew J Daniels
*Assistant Examiner* — Wayne K. Swier
(74) *Attorney, Agent, or Firm* — Sandberg Phoenix and von Gontard

(57) ABSTRACT

The invention relates to a method of manufacturing at least one tank with a shell, in particular a turbojet engine oil tank. The method comprises the following stages: (a) definition of different shell sections (58) for each tank, whereof a first shell section (58) has a recess (60) and a second shell section (58) a boss (62); (b) production of the shell sections (58) by additive manufacturing in which the boss (62) on the second shell section is produced in the recess (60) in the first shell section; then (c) welding of the sections (60) one to the other.

11 Claims, 5 Drawing Sheets

(51) Int. Cl.
*B22F 5/00* (2006.01)
*C22C 1/04* (2006.01)
*B29L 31/00* (2006.01)

(56) References Cited

U.S. PATENT DOCUMENTS

| | | | | |
|---|---|---|---|---|
| 2007/0050979 | A1* | 3/2007 | Huskamp | B22F 10/20 |
| | | | | 29/890.08 |
| 2012/0027507 | A1* | 2/2012 | Meyer | B32B 37/144 |
| | | | | 403/291 |
| 2016/0121389 | A1* | 5/2016 | Slavens | F01D 9/041 |
| | | | | 164/9 |
| 2016/0151977 | A1* | 6/2016 | Burd | B22F 7/062 |
| | | | | 700/98 |
| 2016/0221262 | A1* | 8/2016 | Das | B22C 9/10 |
| 2018/0319077 | A1* | 11/2018 | Blanchet | B22F 5/003 |

\* cited by examiner

ADDITIVE MANUFACTURING METHOD FOR A TURBOFAN ENGINE OIL TANK

TECHNICAL FIELD

The invention relates to the field of tank manufacture. More accurately, the invention relates to the additive manufacture of a tank in sections.

PRIOR ART

The use of additive manufacturing in producing a tank has come up against difficulties due to the size of the printing chamber in the additive manufacturing machine used. In effect, this printing chamber delimits each of the different powder layers which harden there in turn. In particular, the depth of the chamber and the path of the moving platen limit the height of the tank that can be generated there. In order to overcome this limitation, it is known in the art for the tank concerned to be realized in sections.

Document DE 10 2009 034 558 A1 discloses an aircraft fuel tank. This tank comprises an external shell, said shell being formed as a tubular section and a section in the form of a dome. These sections are each produced by additive manufacturing from a titanium alloy. Following production by additive manufacturing, these sections are welded to one another. A manufacturing method of this kind allows complex tank forms to be created, while at the same time using an aluminium alloy.

SUMMARY OF THE INVENTION

Technical Problem

The object of the invention is to solve at least one of the problems posed by the prior art. More accurately, the object of the invention is to reduce the cost of producing a tank by additive manufacturing. The invention likewise has the object of proposing a solution that is simple, resistant, lightweight, reliable, easy to produce and easy to inspect.

Technical Solution

The object of the invention is a method of manufacturing at least one tank with a shell, in particular a turbojet engine oil tank, said method comprising the following stages: (a) definition of different shell sections for each tank, whereof a first shell section has a recess and a second shell section a boss; and (b) production of the shell sections by additive manufacturing; this is notable in that the production stage (b) comprises the production by additive manufacturing of the boss on the second shell section in the recess in the first shell section. According to particular embodiments, the method may comprise one or a plurality of the following characteristics, taken in isolation or in any technically feasible combinations:

- At the end of the production stage (b), the recess surrounds the boss, or at least a portion thereof.
- The recess forms a cup in which the boss is disposed at the end of the production stage (b).
- Level with the boss, the second shell section comprises a thickness E which is totally housed in the recess at the end of the production stage (b).
- At the end of the production stage (b), the surface of the boss is for the most part within the recess.
- The first shell section and the second shell section each comprise a tubular portion, said tubular portions being embedded one in the other at the end of the production stage (b).
- The first shell section and the second shell section each comprise a spheroidal portion, said spheroidal portions being embedded one in the other at the end of the production stage (b).
- Each spheroidal portion generally forms an eighth of a sphere or a quarter of a sphere or a half-sphere.
- The recess is substantially of a shape matching the shape of the boss.
- At the end of the production stage (b), the two shell sections are spaced apart one from the other following their thicknesses.
- At the end of the production stage (b), the two shell sections are stacked in order of thickness.
- Each shell section exhibits a length at the end of the production stage (b), the two shell sections are offset one in respect of the other according to their lengths.
- At the end of the production stage (b), the first shell section comprises a mounting flange which projects towards the opposite side of the second shell section and/or the second shell section comprises a stiffener which projects from the recess.
- During the definition stage (a), at least a third of the shell section is defined with a recess and a boss, at the end of the production stage (b) the boss on the third shell section is embedded in the recess in the first shell section through the second shell section.
- From the point of view of the first shell section, at the end of the production stage (b), the second shell section hides the third shell section, possibly for the most part or completely.
- The shell comprises a portion, possibly formed by sheet metal with a constant thickness, welded to one of the shell sections.
- Additive manufacturing is manufacturing through the addition of layers, in particular additive manufacturing with powder-based layers, for example using titanium or Inconel powder.
- During the production stage (b), additive manufacturing is carried out in an additive manufacturing machine in a pocket delimited by fixed lateral walls.
- The method further comprises a welding stage (c) of shell sections produced during the production stage (b).
- At the end of the production stage (b), the shell sections are shell sections of the same tank or of two different tanks.
- The concave surface defines an internal volume in which the convex surface is manufactured during the production stage (b).
- At the end of the production stage (b), the boss fits snugly in the recess; and/or the boss and the recess are contact-free.
- The shell sections have identical lengths.
- The first shell section is identical to the second shell section, the first shell section notably comprising a boss and the second shell section notably comprising a recess.
- The spheroidal portions have the same mean radii.
- In a certain orientation, the cup is capable of containing a liquid.
- At the end of the production stage (b), the boss in the second section is produced by additive manufacturing in the recess in the first section of the same tank.

The pocket comprises a moving platen, in particular a lower platen, and/or an open upper face.

At the end of the production stage (b), the first section is integral with the second section and/or they are linked to the same support, possibly a sacrificial support.

The recess in the first section forms a concave surface and the boss in the second section forms a convex surface which is embedded in the concave surface at the end of the production stage (b).

At least one or more or each shell section exhibits a different thickness and possibly a ratio of 1 to 2 or 1 to 3 or 1 to 4 between its minimal thickness and its maximum thickness.

As a general rule, advantageous variants of each object of the invention are likewise applicable to the other objects of the invention. Wherever possible, each object of the invention can be combined with other objects. The objects of the invention can likewise be combined with embodiments of the description which, moreover, can be combined with one another.

Advantages Provided

The invention allows different sections of a tank to be assembled in the same filling phase of the production pocket of the additive manufacturing machine. At the end of a production run in the pocket, the ratio between the hardened powder and the raw powder increases. In this way, it becomes possible to optimize the usage rate of the useful space in the additive manufacturing machine. The size of the tanks that can be produced by one and the same additive manufacturing machine can then increase.

Moreover, the invention both allows the shell to be refined, making it lighter at the points where there is less mechanical stress, and the welds to be located wisely, once again depending on the mechanical stress. Simplification of the welds may likewise come into play.

DESCRIPTION OF THE EMBODIMENTS

In the following description, the directions used may correspond to the normal assembly direction. The inside of the tank relates to its main storage space and the outside to its environment.

Figure 1:
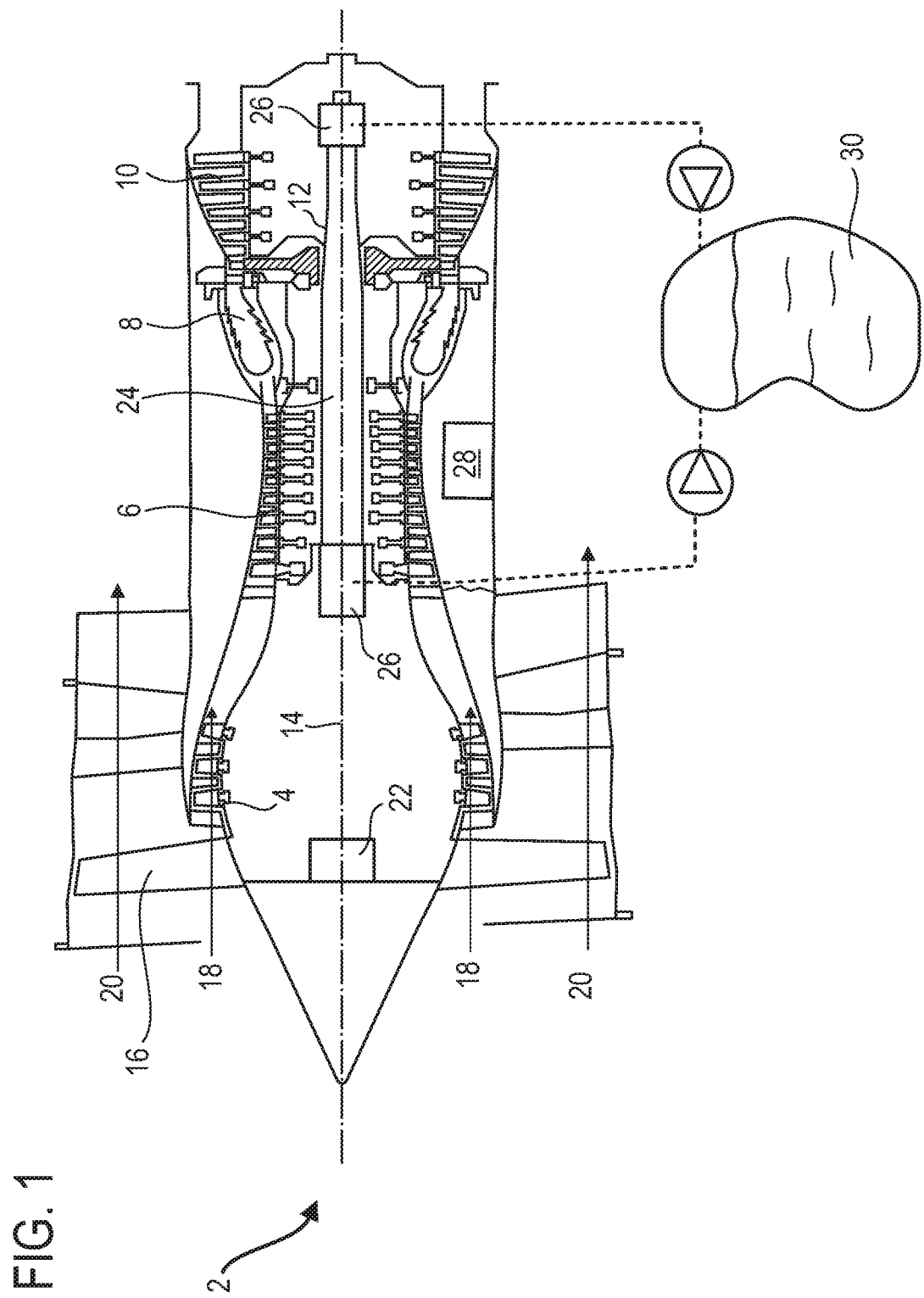
FIG. 1 shows a turbojet engine according to the invention.

FIG. 1 shows in a simplified manner an axial turbofan engine. In this particular case, it is a twin-flow turbojet engine. The turbojet engine 2 comprises a first compression level, in other words a low-pressure compressor 4, a second compression level, in other words a high-pressure compressor 6, a combustion chamber 8 and one or a plurality of turbine levels 10. During operation, the mechanical power of the turbines 10 transmitted via shafts 24 to the rotor 12 initiates movement of the two compressors 4 and 6. Said compressors comprise multiple rows of rotor blades associated with rows of stator blades. The rotation of the rotor about its rotational axis 14 therefore allows an air flow to be generated and the latter to be progressively compressed up to the input to the combustion chamber 8.

An intake fan commonly referred to as a fan or blower 16 is coupled with the rotor 12. It generates an air flow which is divided into a primary flow 18 passing through the different levels of the turbofan engine referred to above and a secondary flow 20 passing through an annular conduit. The secondary flow 20 may be accelerated in such a manner as to generate a useful thrust reaction for the flight of an aircraft.

The rotor 12 comprises a plurality of concentric shafts 24 which are articulated in a rotating manner via bearings 26. The cooling and/or lubrication of the bearings 26 and of an optional epicyclic reduction gear assembly 22 are guaranteed by an oil circuit, possibly a closed circuit. This circuit may be characteristic of the turbojet engine 2. The oil circuit may likewise comprise a heat exchanger 28 to cool the oil which may exceed 200° C. and even 230° C. in certain cases. These temperatures increase the aggressivity of the corrosive oil in respect of elastomer joints and polymer zones in general.

The position and orientation of the tank 30 are figurative in this case. In practice, this tank 30 may be fixed to the casing of the turbojet engine 2. For example, it may be attached to the fan housing 16, to the housing of the low-pressure compressor 4 or to the housing of the high-pressure compressor 6. These installations tend to add thermal stresses and directly expose it to the turbojet engine vibrations, particularly in the event of a loss of the fan. During operation, the tank 30 is partially filled with a mixture of air/oil with impurities such as abrasive metallic particles.

Figure 2:
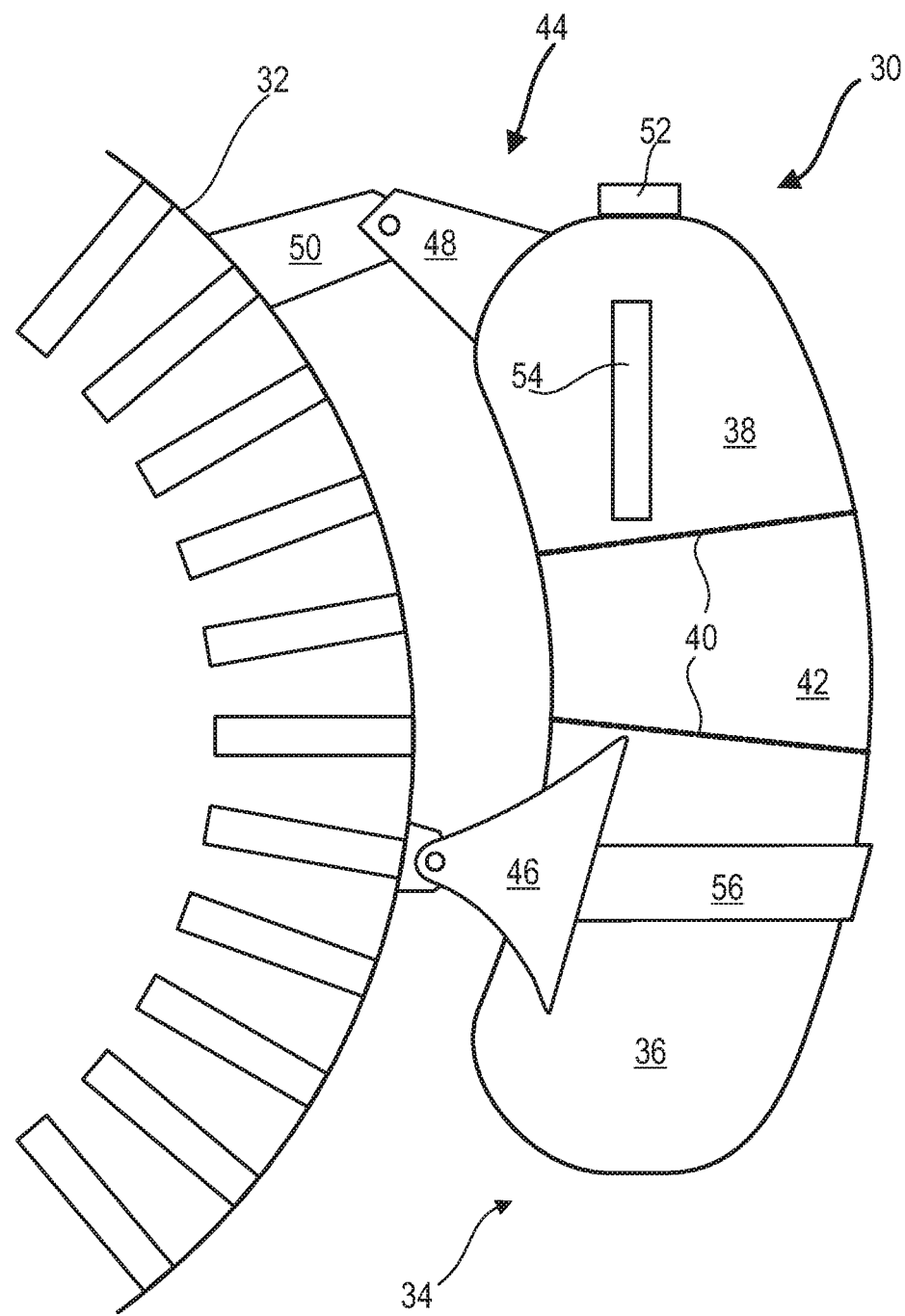
FIG. 2 depicts a turbojet engine casing supporting a tank according to the invention.

FIG. 2 shows the fixing of the oil tank 30 to a support casing 32 of the turbojet engine. In this case, it may be the casing 32 of the low-pressure compressor. The turbojet engine may correspond to that in FIG. 1.

In order to increase its useful volume, despite the smaller amount of space in the turbojet engine, the tank 30 is substantially lengthened and curved, so that it fits snugly with the outer curvature of the support casing 32. This compactness allows insertion between two closely disposed tubular walls.

In the normal assembly direction, the tank 30 may exhibit a shell 34 with a lower end 36 and an upper end 38. These ends (36; 38) may be attached by a weld 40 or via a central portion 42 of the shell 34. Each weld 40 may form a closed loop about the general longitudinal axis of the tank. The shell 34, a real skin, delimits a main storage space (not shown) forming an oil storage capacity. This space is an internal space intended to be filled. The term "main" used to describe the main space is understood in the sense that it involves the largest receptacle of the tank 30.

In terms of assembly on the support casing 32, the tank 30 exhibits a mounting portion 44 which projects in relation to the shell 34, for example towards the casing 32. This mounting portion 44 may comprise one or at least two mounting flanges 46. The flanges 46 may be attached to thickened areas of the shell 34 forming bases which are reinforced and spaced apart. For its part, the upper end 38 may exhibit a securing arm 48, for example attached to the casing 32 via a pivot arm 50.

The tank 30 may comprise other pieces of equipment. For example, it may comprise inlet and outlet openings (not shown). A plug 52 may be placed at the upper end 38. A level inspection window 54 may be formed towards the upper end

38. A deaerator, a blowhole and/or an oil separator (not shown) may be combined with the tank 30.

The tank 30 is advantageously produced by additive manufacturing, at least in part. Its shell 34 may be completely produced in this way. The central portion 42 is produced by additive manufacturing or with the help of sheet metal from rolling. The thickness of the shell 34 may vary between 2 mm and 0.5 mm, or 1.5 mm to 1 mm.

Moreover, the mounting flanges 46 may be integral with the shell 34. Optionally, the tank 30 exhibits a belt 56 on the outside. Said belt links the flanges 46 and forms a thickness allowance located on the shell 34.

Figure 3:
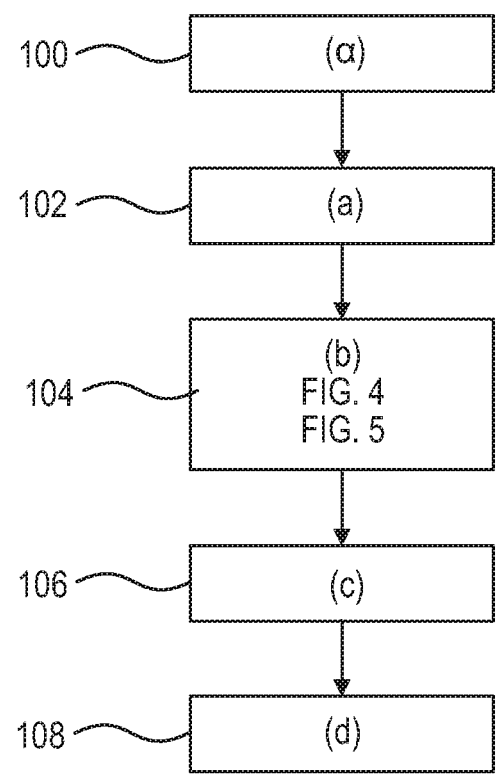
FIG. 3 shows a diagram of the manufacturing method of the oil tank according to the invention.

FIG. 3 is a diagram of the production method of at least one tank, for example an oil tank, such as that depicted in relation to the preceding figures.

The method may comprise the following stages, possible realized in the order set out below:

(α) design 100 of a turbofan engine oil tank taking account of the operating stresses and a service life of at least 10 years or 15 years or 25 years;
(a) definition 102 of different shell sections of the tank, a first part whereof has a recess and a second part a boss; and
(b) production 104 of the shell sections by additive manufacturing in a machine with a fixed-section printing chamber;
(c) welding 106 of the sections one to the other; and
(d) finishing 108 of the tank, including the sandblasting and treatment of the shell. According to the invention, the (α) design 100, (c) welding 106 and (d) finishing 106 stages remain entirely optional.

The (α) design 100 and (a) definition 102 stages can be carried out simultaneously.

The (a) definition 102 stage of different shell sections involves performing geometric cutting of the shell. Said shell is then virtually split. The joining of the sections allows the shell to be fully formed. For example, the shell is divided into two to ten sections, or into four to eight sections, or into five to nine sections, possibly in order to limit the welds. The sections may be angular sections and/or longitudinal segments. This (a) definition 102 stage may be carried out with the help of computer-aided design software. A same end of the shell may be cut into a plurality of sections, for example into two or four sections.

The (b) production 104 stage may be manufacture by scanning a powder bed with an electron beam or a laser beam. The (b) production 104 stage is carried out in a pocket on a mobile platen of an additive manufacturing machine where the powder bed is renewed then pre-compacted prior to solidification. During this (b) production 104 stage, the powder may be preheated, for example to 700° C. The raw powder may have a granulometry of 20 μm. It may be a metallic powder that is sintered or fused locally.

The (c) welding 108 stage allows the sections to be attached one to the other, for example using longitudinal seams and circular seams.

Figure 4:
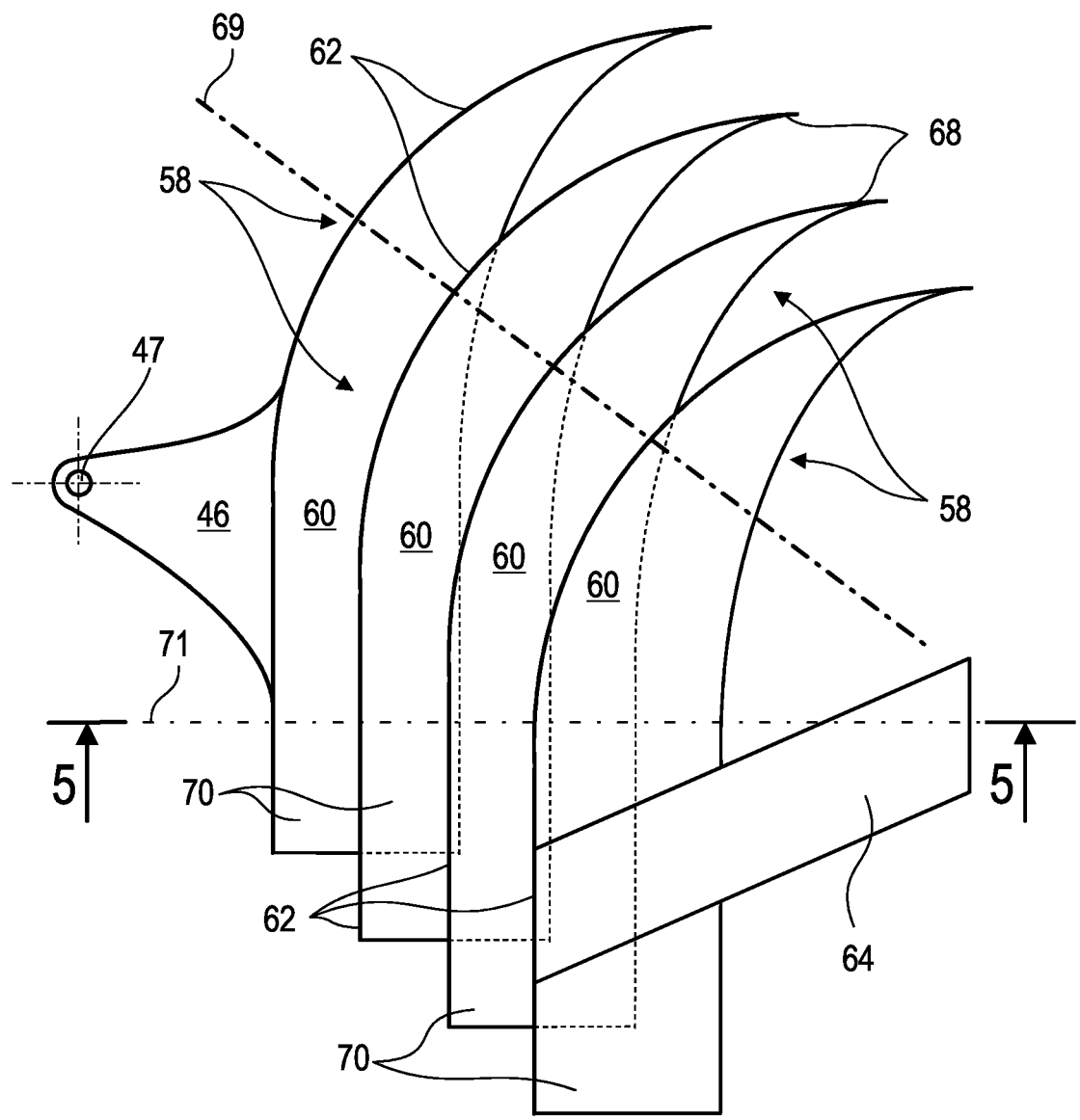
FIG. 4 shows a batch of shell sections produced by additive manufacturing according to the invention.

FIG. 4 depicts a result, possibly an intermediate result, of the production stage (b) of the method in FIG. 3. It shows a batch of casing sections 58 produced during the same additive manufacturing process of the machine used. The sections 58 are depicted in section, for example through the centre thereof. These sections may be those of the same tank or of a plurality of tanks. These tanks may represent the same model or different models of tank.

This batch may form a set, the size of which optimizes the occupation of the manufacturing pocket, in order to increase the production rate. In this set, the sections 58 are embedded one inside the other. They form shell fractions. These sections 58 have concave surfaces and convex surfaces, namely recesses 60 and boss 62. Each recess 60 and each boss 62 can be extended over the entire length of the corresponding section. Optionally, a segment or a section edge may be regarded as a boss. In order to optimize the use of the additive manufacturing machine, bosses are produced in the recessed forms during the (b) production stage. The bosses 62 may fit snugly in the recesses 60 with which they are engaged. Their facing surfaces may generally be matching. In order to optimize manufacturing still further, a plurality of sections may penetrate the same concave surface. In other words, the same recess 60 may house, at least partially, a plurality of bosses 62 which are themselves interlocked. At least 10% or 20% or 50% of the surface of a boss 62 is contained in one or a plurality of recesses 60.

The flange 46 and the stiffener 64 may be manufactured towards the outside of the set. The flange 46 with an attachment opening 47 may project from a concave surface, namely from a boss 62. Likewise, the stiffener 64 may project from the recess 60 in its section 58, but it may likewise reach on or at least two neighbouring recesses 60.

During additive manufacturing, the sections 58 may be attached one to the other in respective positions and orientations which differ from that they would have in the finished tank. Therefore, these sections 58 are detached one from the other with a view to being welded in their predefined respective orientations. The sections 58 may be angular sections. For example, they may form a half-sphere, a sixth of a sphere, in this case an eighth of a sphere 68. Also, they may form an eighth mould of a cube with a corner of said cube. The sphere portions have each a central radial direction 69 (i.e., a radial axis angularly in the middle of each sphere portion), and FIG. 4 shows that after having been manufactured, the central tubular radial directions 69 of all sections 58 coincide. The sections 58 may likewise comprise a projection, for example a tubular portion 70 such as a half-tube or an angular tube fraction, or even an edging profile. During the (b) production stage, the tubular portions 70 are produced one inside the other, just like the spherical portions which remain one inside the other. The tubular portions have each a central radial direction 71 and after having been manufactured, the central tubular radial directions 71 of all sections 58 coincide.

Each section 66 has a general direction, for example following their main length. A general direction may be a mean line of the centres of gravity of the profiles of one section, possibly horizontal profiles, and/or those parallel to the axis 5-5. During the production stage (b), the sections may be staggered in their general directions. In particular, they may exceed one another following the general directions.

The sections are produced forming a stack according to their thicknesses. They may retain a generally constant spacing over the majority of their length or substantially their entire length. This can be observed following a longitudinal section, namely according to the lengths of the sections 58, or also general directions.

The sections 66 may be produced using equipment or portions of equipment. They may form the inlet, the outlet, the window, the blowhole, the deaerator, the oil separator, the inlet filter.

Figure 5:
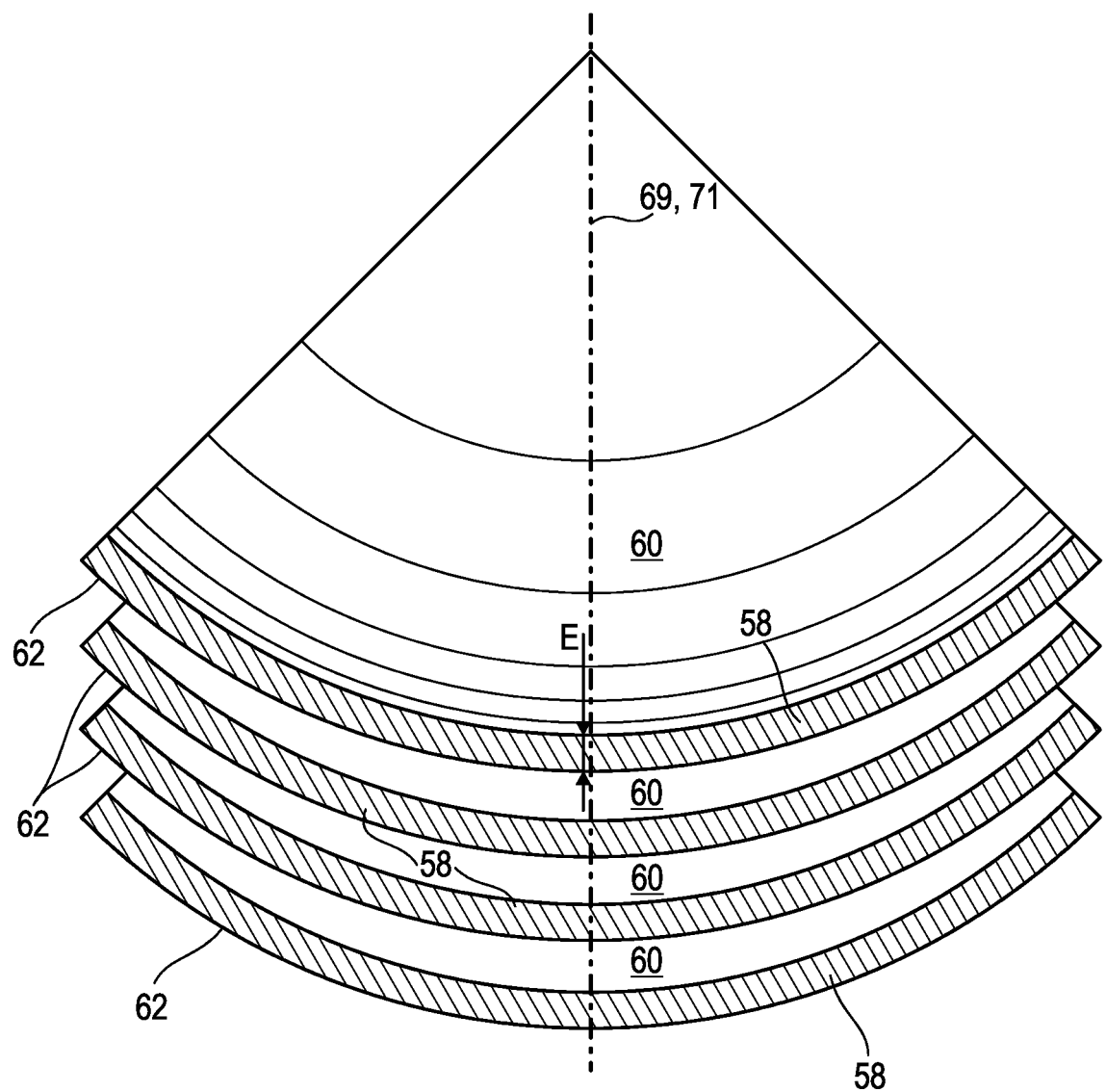
FIG. 5 is a cross section through axis 5-5 of the batch of casing sections in FIG. 4 according to the invention.

FIG. 5 depicts a section through the batch of shell sections 58. The section follows the axis 5-5 depicted in FIG. 4. The four sections 58 may form a closed loop or circle following the welding stage (c) in the method.

The different sections 58 appear stacked one on top of the other according to their thicknesses. This figure also shows the axes 69 and 71 (69 is actually hidden behind 71 due to the direction of view indicated by the arrows on FIG. 4). One can see that the sections 58 are offset with respect to one another along these axes. The convex bosses 62 are engaged with the concave recesses 60 facing them and some are engaged with another recess 60 concealed by a spacer section 58. According to the stacking, the boss 62 in the top portion 58 is engaged with two recesses 60 in stacked shell sections 58. In particular, its thickness E, for example in the middle, is completely housed in at least one or in at least two recesses 60.

The recesses 60 define cups which particularly form basins. The cups are flattened and open at the top, as shown in the present figure. They each exhibit an edge forming a loop in elevation in respect of their base. Depending on their orientations, they are capable of containing a liquid. Assuming that these cups would be filled with a liquid, placing the section facing this cup in its corresponding position at the end of the (b) manufacturing stage would cause the liquid to overflow.

The invention claimed is:

1. A manufacturing method of at least one turbojet engine tank with a shell, said method comprising the following stages:
    definition of different shell sections for each tank, whereof a first shell section includes a recess, a second shell section includes a boss and a third shell section comprises a recess and a boss, wherein the recess of the first shell section is of a shape matching the shape of the boss of the second shell section; and
    production of the shell sections by additive manufacturing, wherein the production stage comprises the production by additive manufacturing of the boss of the second shell section within the recess of the first shell section,
    wherein the first shell section, the second shell section, and the third shell section each comprise a spheroidal portion and a tubular portion, said spheroidal portion defining a respective central spheroidal radial direction and said tubular portion defining a respective central tubular radial direction, said spheroidal portions being embedded one in the other at the end of the production stage, and said tubular portions being embedded one in the other at the end of the production stage,
    wherein the production stage comprises the production by additive manufacturing of the boss of the second shell section and the boss of the third shell section within the recess of the first shell section; the third shell section being embedded in the recess of the first shell section through the boss of the second shell section,
    wherein the production stage is such that at the end of the production stage, the first, second and third shell sections are offset with respect to one another in such a way that their respective central spheroidal radial direction coincide and their respective central tubular radial direction coincide.

2. The manufacturing method in accordance with claim 1, wherein at the end of the production stage, the recess of the first shell section surrounds the boss of the second shell section, or at least a portion of the boss of the second shell section.

3. The manufacturing method in accordance with claim 1, wherein the recess of the first shell section forms a cup in which the boss of the second shell section is disposed at the end of the production stage.

4. The manufacturing method in accordance with claim 1, wherein at the end of the production stage, the surface of the boss of the second shell section is within the recess of the first shell section.

5. The manufacturing method in accordance with claim 1, wherein each spheroidal portion forms an eighth of a sphere or a quarter of a sphere or a half-sphere.

6. The manufacturing method in accordance with claim 1, wherein at the end of the production stage, the first shell section comprises a mounting flange and the second shell section comprises a stiffener which projects from its recess.

7. The manufacturing method in accordance with claim 1, wherein from the point of view of the first shell section, at the end of the production stage, the second shell section hides the third shell section.

8. The manufacturing method in accordance with claim 1, wherein additive manufacturing is manufacturing through the addition of layers, in particular additive manufacturing with powder-based layers.

9. The manufacturing method in accordance with claim 1, wherein during the production stage, additive manufacturing is carried out in an additive manufacturing machine in a pocket delimited by fixed lateral walls.

10. The manufacturing method in accordance with claim 1, further comprising a welding stage of the shell sections produced during the production stage.

11. The manufacturing method in accordance with claim 1, wherein at the end of the production stage, the shell sections are shell sections of the same tank or of two different tanks.

* * * * *

UNITED STATES PATENT AND TRADEMARK OFFICE
CERTIFICATE OF CORRECTION

| | | |
|---|---|---|
| PATENT NO. | : 11,440,245 B2 | Page 1 of 1 |
| APPLICATION NO. | : 15/727708 | |
| DATED | : September 13, 2022 | |
| INVENTOR(S) | : Stephane A. Bougelet et al. | |

It is certified that error appears in the above-identified patent and that said Letters Patent is hereby corrected as shown below:

On the Title Page

Under Foreign Application Priority Data, please insert -- "This application claims priority to Belgian Application No. 2016/5769, filed October 13, 2016" --.

Signed and Sealed this
Sixth Day of December, 2022

Katherine Kelly Vidal
*Director of the United States Patent and Trademark Office*